United States Patent
Corte et al.

[15] 3,687,912
[45] Aug. 29, 1972

[54] CROSSLINKED ACRYLONITRILE COPOLYMERS

[72] Inventors: Herbert Corte, Opladen; Harold Heller, Leichlingen, both of Germany

[73] Assignee: Farbenfabriken Bayer Aktiengesellschaft, Leverkusen, Germany

[22] Filed: Sept. 24, 1970

[21] Appl. No.: 75,238

Related U.S. Application Data

[63] Continuation of Ser. No. 802,243, Feb. 25, 1969, abandoned.

[30] Foreign Application Priority Data

March 14, 1968 Germany..........P 17 20 803.6
March 14, 1968 Germany..........P 17 20 804.7

[52] U.S. Cl......260/80.81, 260/2.2 R, 260/78.5 UA, 260/80.7, 260/80.78, 260/85.5 ES, 260/85.5 AM, 260/85.5 B, 260/85.5 HC, 260/85.5 R, 260/486 R

[51] Int. Cl..........................C08f 15/36, C08f 15/40
[58] Field of Search............260/85.5 ES, 80.7, 80.81

[56] References Cited

FOREIGN PATENTS OR APPLICATIONS 503,598  6/1954  Canada.....................260/78.5
778,104  7/1957  Great Britain............260/85.5

*Primary Examiner*—Joseph L. Schofer
*Assistant Examiner*—Stanford M. Levin
*Attorney*—Connolly & Hutz

[57] ABSTRACT

Cross-linked acrylonitrile copolymer wherein the cross-linking monomer is a carbocylic carboxylic acid ester having two non-conjugated polymerizable double bonds and preparation thereof by free radical copolymerization.

6 Claims, No Drawings

CROSSLINKED ACRYLONITRILE COPOLYMERS

CROSS-REFERENCE TO RELATED APPLICATION

This application is a continuation of application Ser. No. 802,243 filed Feb. 25, 1969 and now abandoned.

This invention relates to the preparation of cross-linked acrylonitrile polymers by radical copolymerization of acrylonitrile with compounds which have two non-conjugated polymerizable double bonds as cross-linking agents.

The preparation of cross-linked acrylonitrile polymers by copolymerization of acrylonitrile with compounds which contain at least two non-conjugated polymerizable double bonds has been known for a long time. Numerous cross-linking substances of this type have already been described, e.g., methacrylic acid anhydride, vinyl, allyl esters of (meth) acrylic acid, (meth)acrylic acid esters of polyhydric alcohols, allyl esters of dibasic acids, N, N'-methylene bisacrylic acid amide, triacryloyl-sym.-perhydro-triazine, vinyl ethers, allyl ethers or homologous ethers, di-or trivinylbenzene, divinyltoluene, divinylxylene, polyvinylanthracene or divinylpyridine.

The known cross-linked acrylonitrile copolymers have defects in many respects. Thus, for example, among the cross-linked substances, methacrylic acid anhydride, vinyl and allyl esters of (meth)acrylic acid, (meth) acrylic acid esters of polyhydric alcohols, allyl esters of dibasic acids, N,N'-methylene-bis-acrylic acid amide, triacryloyl-sym.-perhydrotriazine, vinyl ethers, allyl ethers and homologous ethers are not resistant to hydrolysis, so that the corresponding copolymers of acrylonitrile go into solution completely when subjected to hydrolysis with strong acids or alkalies.

On the other hand, the copolymers obtained when using, e.g., divinylbenzene as a cross-linking agent are always unevenly cross-linked owing to the different polymerization velocities of the monomers and contain relatively high proportions of uncrosslinked and therefore soluble polyacrylonitrile. If the copolymers are obtained according to another known process by copolymerization in the presence of organic solvents, the solubility of the polymers is even considerably increased (see Belgian Patent 704,013).

A process for the production of cross-linked, insoluble copolymers of acrylonitrile which are resistant to hydrolysis has now been found wherein acrylonitrile and optionally another monomer which can be copolymerized with acrylonitrile is copolymerized with the aid of a catalyst in the presence of carboxylic acid esters which have two non-conjugated, polymerizable double bonds of the general formula:

in which A denotes an aromatic or a cycloaliphatic radical such as the radicals derived from benzene, naphthalene, biphenyl or diphenylmethane; X represents an alkyl radical which is olefinically unsaturated in the end position, such as the vinyl, allyl or isopropenyl radical or Y; Y represents the radical

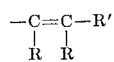

in which R represents a hydrogen atom or a lower alkyl radical and R' represents an alkoxycarbonyl, cycloalkoxycarbonyl or phenoxycarbonyl radical; Z represents a lower alkyl radical or a halogen atom; and $n$ denotes zero or an integer of from 1 to 4 optionally in the presence of another cross-linking agent which is resistant to hydrolysis.

Examples of carboxylic acid esters which have two non-conjugated polymerizable double bonds in accordance with this invention are the esters of the following acids:
p-Vinylcinnamic acid,
m-vinylcinnamic acid,
p-isopropenylcinnamic acid,
m-isopropenylcinnamic acid,
benzene-bis-($\beta$-acrylic acid)-(1,4),
benzene-bis-($\beta$-acrylic acid)-(1,3),
diphenyl-bis-($\beta$-acrylic acid)-(2,2'),
diphenylmethane-bis-($\beta$-acrylic acid)-(4,4'),
naphthalene-bis-($\beta$-acrylic acid)-(1,4),
naphthalene-bis-($\beta$-acrylic acid)-(1,3),
naphthalene-bis-($\beta$-acrylic acid)-(1,5),
naphthalene-bis-($\beta$-acrylic acid)-(2,6).

These compounds can be obtained by reacting a suitable aldehyde containing an alkenyl group or a dialdehyde with melonic acid. The reaction may be carried out, e.g., in an inert solvent at temperatures of between 50° and 150°C., optionally with a basic catalyst.

From among the above-mentioned carboxylic acid esters, the dicarboxylic acid esters which have two polymerizable double bonds are especially preferred, and among these again the benzene-bis-acrylic acid ester, e.g. benzene-bis-(methyl-$\beta$-acrylate)-(1,4), benzene-bis-(butyl-$\beta$-acrylate)-(1,4) and benzene-bis-(methyl-$\beta$-acrylate)-1,3).

Di- and polyvinyl aromatic compounds such as divinyl-benzene, trivinylbenzene, divinyltoluene, divinylxylene and divinylnaphthalene may also be used as cross-linking agents according to this invention.

Other copolymerizable monomers, e.g., vinyl monomers may also be used for the preparation of the copolymers together with acrylonitrile and the cross-linking agents. The following, for example, are suitable for this purpose: Aromatic monovinyl compounds such as styrene and substituted styrenes, vinyl esters, vinylidene chloride, esters of $\alpha,\beta$-olefinically unsaturated carboxylic acids such as acrylic and methacrylic acid esters and conjugated diolefines such as butadiene, isoprene or chloroprene. These additional monomers are preferably used in quantities of about 1 to 50 percent by weight, based on the total weight of monomers. The mechanical properties of the end products can be varied by incorporating these additional monomers by polymerization.

The copolymerization of the above-mentioned monomers can be carried out by known processes in bulk, solution, suspension, or emulsion. According to a preferred method of carrying out the process, the monomers are subjected to copolymerization in aqueous suspension. The usual compounds which form free radicals, such as organic or inorganic peroxides or catalysts which contain azo groups, for example, acetyl peroxide, benzoyl peroxide, lauroyl peroxide cumenehydroperoxide or azo-diisobutyric acid nitrile, may be used as polymerization catalysts. The effect of these catalysts can be enhanced by employing heat and/or actinic radiation. So-called activators such as inorganic oxidizable, oxygen-containing sulphur compounds or amines may also be used in addition to the above-mentioned catalysts. When using suspension polymerization the copolymers are obtained in the form of small spheres or beads the size of which can be determined by the speed of stirring, the use of dispersing agents such as kaolin, polyvinyl alcohol or methyl cellulose, and regulation of the temperature.

To produce copolymers which have a large pore structure, polymerization may be carried out as described in German Auslegeschrift No. 1,113,570, i.e., in the presence of organic solvents in which the monomers are soluble but the polymer is insoluble and incapable or almost incapable of swelling. These organic solvents which cause neither solution nor swelling of the polymers may, for example, be aliphatic hydrocarbons, alcohols, ethers nitro compounds or esters.

The degree of cross-linking of the polymers may be varied within wide limits. For example, monomer mixtures of 1 to 20 percent and preferably 3 to 10 percent, by weight of a carboxylic acid ester of the above-mentioned type which contains two polymerizable double bonds and 99 to 80 percent, preferably 97 to 90 percent, by weight of acrylonitrile may be used for the preparation of the acrylonitrile copolymers. To produce especially highly cross-linked acrylonitrile polymers, another cross-linking agent which is resistant to hydrolysis, e.g., divinyl benzene, may be used in addition to a carboxylic acid ester of the type described above. In this preferred embodiment, the monomer mixture which is to be polymerized contains 1 to 10 percent by weight, preferably 2 to 5 percent by weight of a doubly unsaturated carboxylic acid ester and 2 to 10 percent preferably 3 to 8 percent by weight of the other cross-linking agent, preferably divinylbenzene, in addition to acrylonitrile. The polymerization itself is carried out in the usual manner. The polymerization process has been described, for example, in British Patent Specifications Nos 778,104 and 972,897.

The use of doubly unsaturated carboxylic acid esters as cross-linking agents yields completely cross-linked polymers which contain practically no soluble constituents. The cross-linking itself is resistant to hydrolysis. It will therefore be advantageous to replace the partly cross-linked acrylonitrile polymers hitherto known with these polymers wherever it is important to achieve cross-linking which is resistant to hydrolysis and insolubility of the polymers.

The present invention is further concerned with the production of completely insoluble ion-exchanger resins which are resistant to acids and alkalies on the basis of the cross-linked acrylonitrile polymers described above.

When using cross-linked acrylonitrile polymers for the production of weakly acidic ion-exchanger resins, not only must the molecules of cross-linking agent be resistant to hydrolysis but the polymers must also be completely cross-linked. A proportion of uncrosslinked or very slightly cross-linked polyacrylonitrile such as produced, e.g., when using divinylbenzene as the sole cross-linking agent, as already explained above, is highly undesirable and constitutes a serious disadvantage because the uncrosslinked or very slightly cross-linked polymer portions become soluble at elevated temperature on hydrolysis of the nitrile groups, e.g., with strong alkalies. The use of such incompletely cross-linked cation exchange resin, e.g., for purifying drinking water, is therefore impossible because the uncrosslinked portion dissolve more or less rapidly in the drinking water and even the portions which are only slightly cross-linked gradually dissolve.

It has been found that weakly acidic ion exchangers which have improved properties are obtained if acrylonitrile copolymers of acrylonitrile, carboxylic acid esters which have two unconjugated, polymerizable double bonds of the general formula

and optionally another cross-linking agent which is resistant to hydrolysis, such as those described above, are used for their preparation.

The ion exchangers are prepared by hydrolysis of the nitrile groups in the copolymers of acrylonitrile, doubly unsaturated carboxylic acid esters of the type described above and optionally additional cross-linking agents such as divinylbenzene by known processes (see Houben-Weyl, Methoden der Organischen Chemie, Volume XLV/2, page 708 et seq (1963)).

Weakly acid ion exchanger resins are obtained in excellent yields by this method. They are insoluble in alkalies and acids and thus satisfy the most stringent requirements.

The cation exchanger resins produced according to the invention are tested for their uncrosslinked, i.e., soluble, portions by extraction with water followed by determination of the dissolved substances contained in the extracting agent, as shown in the following examples.

EXAMPLE 1

22.5 g of benzene-bis-(methyl-β-acrylate)-(1,4) and 5 g of dibenzoylperoxide in 75 percent concentration are dissolved successively in 727.5 g of acrylonitrile at about 50°C. The solution is suspended in 1,200 ml of aqueous methyl cellulose solution at 50° to 55°C, the methyl cellulose content of which is 1.8 g, and the reactants are then pearl polymerized with stirring and while nitrogen is passed over for 5 hours at 65°C, b 15 hours at 75 to 80°C and 2 hours at 90°C. The beads formed are dried under vacuum at 100°C. Yield: 700 g = 93.4 percent of the theory. Particle size: 0.2 to 1.0 mm diameter.

EXAMPLE 2

37.5 g of benzene-bis-(methyl-β-acrylate)-(1,3) and 3 g of 2-azo-bis-isobutyric acid nitrile are dissolved successively in 712.5 g of acrylonitrile at about 40°C. The solution is suspended in 1,200 ml of aqueous methyl cellulose solution at 40°C, the methyl cellulose content of which is 1.8 g, and the reactants are then pearl polymerized with stirring and the passing over the nitrogen, for 5 hours at 65°C, 15 hours at 75 to 80°C and 2 hours at 90°C. The beads formed are dried under vacuum at 100°C. The have a particle size of between 0.1 and 1.0 mm in diameter. Maximum: 0.5 to 0.75 mm diameter. The yield is 696 g = 92.8 percent of the theory.

EXAMPLE 3

A mixture of 356.3 g of acrylonitrile, 18.7 g of benzene-bis-(butyl-$\beta$-acrylate)-(1,4) and 5 g of dibenzoyl peroxide, 75 percent, is suspended at room temperature in 600 ml of water in which 0.9 g of methyl cellulose is dissolved, and the mixture is then pearl polymerized with stirring and the passing over of nitrogen for 5 hours at 65°C, 15 hours at 75° to 80°C and 2 hours at 90°C. The beads formed are dried under vacuum at 100°C. Yield: 328 g = 87.5 percent of the theory.

EXAMPLE 4

A mixture of 667 g of acrylonitrile, 22.5 g of benzene-bis-(butyl-$\beta$-acrylate)-(1,4), 60.5 g of commercial divinyl benzene (concentration 61.9 percent, remainder ethyl styrene), 5 g of 75 percent dibenzoylperoxide and 7.9 g of 95 percent dicumyl peroxide is suspended in 1,200 ml of water which contains 1.8 g of methyl cellulose, and pearl polymerized and worked up as described in Example 3.

Yield of pearl polymer: 730 g = 97.4 percent of the theory.

EXAMPLE 5

A mixture of 665.5 g of acrylonitrile, 22.5 g of benze-bis-(methyl-$\beta$-acrylate-(1,3), 62 g of commercial divinyl benzene (60.9 percent, remainder ethyl stryrene) and 5 g of 75 percent dibenzoylperoxide is suspended in 1,200 ml of water which contains 1.8 g of methyl cellulose and pearl polymerized for 5 hours at 65°C. and 2 hours at 90°C. and worked up as indicated in Example 1. Yield: 700 g = 93.4 percent of the theory.

To test for uncross-linked, i.e., soluble constituents a sample of the pearl polymer dried to constant weight is exhaustively extracted with dimethylformamide (DMF) in a Soxhlet apparatus at 50 to 60 mm Hg, corresponding to 80 to 90°C. The evaporation residue of DMF amounts to 1.3 percent, based on the polymer used.

Comparison Test

If, in the example indicated, only acrylonitrile (651.5 g) and commercial divinylbenzene (98.5 g) are worked up under otherwise identical conditions, a pearl polymer which loses 3 percent of the substance on exhaustive extraction with dimethyl formamide is obtained.

EXAMPLE 6

A mixture of 666 g of acylonitrile, 22.5 of benzene-bis-(methyl-$\beta$-acrylate)-(1,3), 61.5 g of commercial divinyl benzene (60.9 percent, remainder ethyl styrene), 75 g of isoctane and 5 g of 75 percent dibenzoyl peroxide is suspended in 1,200 ml of water which contains 1.8 g of methycellulose and then pearl polymerized with stirring and passing over of nitrogen for 5 hours at 65°C. and 2 hours at 90°C. The beads formed are dried under vacuum at 100°C. and tested for soluble constituents as described in Example 5. Yield of pearl polymer: 716 g = 95.5 percent of the theory. Evaporation residue of dimethylformamide: 1.8 percent.

Comparison Test:

If in the example indicated, only acrylonitrile (651.5 g) and commercial divinylbenzene (98.5 g) are used as monomers and hydrogenated triisobutylene is used instead of isooctane, and the process is otherwise carried out in the same way as indicated above, a pearl polymer which loses 7 percent of the substance on exhaustive extraction with dimethyl formamide is obtained.

EXAMPLE 7

22.5 g of benzene-bis-(methyl-$\beta$-acrylate)-(1,4) and 5 g of b 75 percent dibenzoyl peroxide are successively dissolved in a mixture of b 667 g of acrylonitrile, 60.5 g of commercial divinylbenzene (61.9 percent, remainder ethyl styrene) and 150 g of hydrogenated diisobutylene at 50° to 55°C. The solution is suspended in 1,200 ml of aqueous methy cellulose solution at 50° to 55°C. methyl cellulose content 1.8 g, and then pearl polymerized as described in Examples 1 to 3. The beads formed are dried under vacuum at 100°C. Yield: 723 g = 96.5 percent of theory. Particle size: 0.02 to 1.2 mm diameter.

EXAMPLES 8 to 16

The results of extraction tests on cation exchanger resins which have been prepared by alkaline hydrolysis of copolymers of acrylonitrile and various doubly unsaturated compounds are summarized in Table 1 below.

The copolymers are prepared by suspending monomer mixtures of acrylonitrile, a carboxylic acid ester which has two non-conjugated polymerizable double bonds and/or divinylbenzene (approximately 60 percent commercial mixture, remainder ethyl styrene) in 160 percent of a 0.15 percent methyl cellulose solution, using 0.5 percent of dibenzoylperoxide and optionally in the presence of 10 or 20 percent of an inert hydrocarbon based on the total quantity of monomers, and heated with stirring and the passing over of nitrogen for 5 hours at 65°C, 15 hours at 75°C to 80°C. and 2 hours at 90°C, and the beads formed are then dried under vacuum at 100°C, the inert hydrocarbon distilling off in the process.

For hydrolysis, about 400 g of the copolymers, the amount of divinylbenzene and doubly unsaturated carboxylic acid esters in which is indicated in the following Table 1 as the percentage content of the monomer mixture, are heated in 1000 ml of a 45 percent aqueous sodium hydroxide solution and 500 ml of ethanol at from 150° to 155°C for 10 hours. After the reaction liquid has been washed out in a filter tube, the cation exchange is introduced into excess 20 percent hydrochloric acid, and the resulting H form of the exchanger is then washed until neutral.

Two hundred samples of the cation exchanger resins produced in this way were extracted in the Soxhlet with water which was completely free from salt, and the carboxylic acid content in the extract was determined by alkalimetric titration. The results of these extraction tests are given in Table 1.

| Example | Content in the monomer mixture of— | | Divinyl-benzene (100%), percent by weight | Inert hydrocarbon quantity, percent by weight | Extraction of the cation exchanger with water | |
|---|---|---|---|---|---|---|
| | Carboxylic acid esters having two polymerisable double bonds | Quantity, percent by weight | | | Time in hours | Acid content in the extract mval. |
| 8 | Benzene-bis-(methyl-β-acrylate)-(1,4) | 3 | | | 20 | 0.85 |
| 9 | Benzene-bis-(methyl-β-acrylate)-(1,3) | 5 | | | 20 | 0.7 |
| 10 | Benzene-bis-(butyl-β-acrylate)-(1,4) | 3 | 5 | | 20 | 0.7 |
| 11 | Benzene-bis-(methyl-β-acrylate)-(1,3) | 3 | 5 | | 20 | 0.4 |
| 12 | Benzene-bis-(methyl-β-acrylate)-(1,4) | 2 | 5 | | 20 | 0.65 |
| 13 | ...do... | 3 | 5 | Triisobutylene, hydrogenated 10 | 20 | 0.4 |
| 14 | Benzene-bis-(methyl-β-acrylate)-(1,3) | 3 | 5 | Isooctane 10 | 20 | 0.8 |
| 15 | | | 8 | | 20 | 12.0 |
| 16 | | | 8 | Triisobutylene, hydrogenated 10 | 20 | 8.1 |

In Table 2 is also shown the advantageous use of the copolymers of acrylonitrile, carboxylic acid esters with two non-conjugated, polymerizable double bonds and optionally an additional cross-linking agent for the preparation of weakly acidic ion exchanger resins. For some of the above examples, the yield of ion exchange resin is indicated in Table 2 in the H form (dryweight) based on the polymer used. It amounts to 90 to 96 percent of the theoretical yield (Examples 9 to 13) in cases where copolymers which contain a doubly unsaturated carboxylic acid ester of the structure indicated as cross-linking substance were used as starting materials. A substantial loss of substance, on the other hand, occurred when copolymers of acrylonitrile and divinylbenzene were subjected to alkaline hydrolysis (Examples 15 and 16).

TABLE 2

| Example | Copolymer used for hydrolysis (g of dry weight) | Yield of cation exchanger in the H form g of dry weight | = % of the theory |
|---|---|---|---|
| 9 | 200 | 244 | 91 |
| 10 | 500 | 590 | 90 |
| 11 | 400 | 504 | 96 |
| 12 | 400 | 507 | 96 |
| 13 | 500 | 600 | 91 |
| 15 | 500 | 487 | 75 |
| 16 | 400 | 356 | 68 |

We claim:

1. A hydrolysis-resistant, insoluble cross-linked acrylonitrile copolymer of acrylonitrile and, based on the weight of total monomers in said copolymer, 1–20 percent of a cross-linking agent of the formula

wherein A is an aromatic or cycloaliphatic radical, X is vinyl, isopropenyl or Y, Z is lower alkyl or halogen, $n$ is 0 or an integer of from 1 to 4 and Y is of the formula

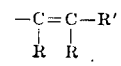

wherein R is hydrogen or lower alkyl and R' is alkoxycarbonyl, cycloalkoxycarbonyl or phenoxycarbonyl.

2. The acrylonitrile copolymer of claim 1 containing a further olefinically unsaturated comonomer.

3. The acrylonitrile copolymer of claim 2 wherein said further olefinically unsaturated comonomer is an aromatic monovinyl compound.

4. The acrylonitrile copolymer of claim 1 wherein divinylbenzene or divinyltoluene is copolymerized as an additional cross-linking agent.

5. The acrylonitrile copolymer of claim 1 wherein said cross-linking agent of said formula is present in an amount of from 3 to 10 percent by weight.

6. The acrylonitrile copolymer of claim 1 wherein said cross-linking agent of said formula is selected from the group consisting of 1,4-bis-(methyl-β-acrylate)benzene, 1,4-bis-(butyl-β-acrylate)benzene and 1,3-bis-(methyl-β-acrylate)benzene.

* * * * *